(12) United States Patent  (10) Patent No.: US 7,437,168 B1
Westfield  (45) Date of Patent: *Oct. 14, 2008

(54) METHOD AND APPARATUS FOR CONTROLLING A QUIET ZONE FOR WIRELESS UNITS

(75) Inventor: William Westfield, Atherton, CA (US)

(73) Assignee: Cisco Technology, Inc., San Jose, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/126,838

(22) Filed: May 11, 2005

Related U.S. Application Data

(63) Continuation of application No. 09/803,424, filed on Mar. 8, 2001, now Pat. No. 6,907,254.

(51) Int. Cl.
*H04Q 7/20* (2006.01)

(52) U.S. Cl. .............. 455/456.4; 455/404.2; 455/457; 455/433; 455/411; 455/456.1

(58) Field of Classification Search ............. 455/456.4, 455/404.2, 457, 433, 411, 456.1
See application file for complete search history.

(56) References Cited

U.S. PATENT DOCUMENTS

| 6,212,390 | B1 | 4/2001 | Rune | |
|---|---|---|---|---|
| 6,351,643 | B1 | 2/2002 | Haartsen | |
| 6,487,406 | B1 | 11/2002 | Chang et al. | |
| 6,487,602 | B1 | 11/2002 | Thakker | |
| 6,515,997 | B1 | 2/2003 | Feltner et al. | |
| 6,526,272 | B1 | 2/2003 | Bansal et al. | |
| 6,567,664 | B1 | 5/2003 | Bergenwall et al. | |
| 6,567,668 | B1 * | 5/2003 | Valentine et al. | ......... 455/456.1 |
| 6,587,684 | B1 | 7/2003 | Hsu et al. | |
| 6,625,455 | B1 | 9/2003 | Ariga | |
| 6,675,002 | B1 * | 1/2004 | Lipovski | ................... 455/194.1 |
| 6,694,143 | B1 | 2/2004 | Beamish et al. | |
| 6,832,093 | B1 * | 12/2004 | Ranta | ....................... 455/456.4 |
| 7,039,425 | B1 * | 5/2006 | Mazawa et al. | .......... 455/456.4 |
| 7,043,260 | B2 * | 5/2006 | Kim | ............................ 455/458 |
| 2002/0077118 | A1 | 6/2002 | Zeller et al. | |

OTHER PUBLICATIONS

Private communication posted by Øyvind Kaurstad to PICLIST Mailing List on Mar. 16, 2000.

* cited by examiner

*Primary Examiner*—Nghi H Ly
(74) *Attorney, Agent, or Firm*—Cindy Kaplan

(57) ABSTRACT

In an IP-based cellular wireless communication system, systems and methods for spatially controlling cellular phone usage are provided. Entry of a cellular phone device into an area of restricted phone access ("quiet zone") is detected and an IP message identifying the phone sent to a central facility. In one embodiment, an IP message is sent to the phone causing it to change behavior, for example turning off the volume on the ringer. Alternatively, the central facility can process an incoming call for a phone that is determined to be in a quiet zone to reduce intrusion in the quiet zone; for example, it can send the call to a phone mailbox or give the caller a busy signal.

9 Claims, 14 Drawing Sheets

METHOD AND APPARATUS FOR CONTROLLING A QUIET ZONE FOR WIRELESS UNITS

This application is a continuation of co-pending U.S. patent application Ser. No. 09/803,424, filed Mar. 8, 2001, which is incorporated herein by reference in its entirety.

The present invention relates to wireless units including cellular telephones with IP capability. In particular, it relates to providing control over IP cellular phone units within a physical area such as a theater or restaurant.

The use of cellular telephones using various protocols including CDMA and GSM, as well as the use of other cellular devices such as PCS devices, is ubiquitous. These cellular units can cause unwelcome sounds in shared spaces causing annoyance. For example, phones may ring during a theater performance or persons may converse on a cell phone at a quiet restaurant.

Although sometimes a venue requests cellular phone users to turn off their phones while inside the space, such as by posting signs or making an announcement prior to a performance, this is not always effective. Sometimes the cell phone user wishes to comply with the request but forgets to turn off the phone, and sometimes the cell phone user ignores the request. Therefore, it is desirable for the operator of a restaurant, theater, or other space to obtain control over cellular units within their space.

Major initiatives have been taken by various entities, including the International Telecommunication Union (ITU), to push forward universal mobile systems, called third generation or 3G mobile systems. Standards for third generation wireless include W-CDMA and IMT-2000, which is a standard adopted by the ITU. IMT-2000 encompasses a variety of mobile or fixed terminals (cellular phone units) that can provide phone service, web access, video teleconferencing, and other services. The mobile terminals are linked by one or more radio links to various telecommunications services and networks (e.g. PSTN/ISDN/IP) and other services. Information about IMT-2000 is available from various sources, including www.itu.org, www.3gpp.org, and www.3gpp2.org.

An overall architecture for a wireless IP network architecture based on various protocols has been described in the Internet Engineering Task Force's *Wireless IP Network Architecture based on IETF Protocols* (Tom Hiller, ed.), IETF TR45.6 Ballot (Feb. 4, 2000), which is hereby incorporated by reference. This document describes the packet data services to be provided, and sets forth the packet data system architecture for a third generation wireless system based on IMT-2000. The described system is designed to have general capabilities that match those outlined in the ITU IMT-2000 requirements document Q.1701. IETF protocols are employed wherever possible to minimize the number of new protocols required.

An example wireless IP network architecture is shown in FIG. 1A. A user uses mobile station 10 to connect to Radio Network 20 (also called a Radio Access Network, or "RAN") via an air interface, and through the Radio Network 20, gains access to a service provider network. Only one service provider network may be accessed by the mobile station 10 at a time, and the service provider network may be the user's home access provider or if the user is roaming, the visited access provider network. Existing air interface procedures are used for access mobility management, including interactions with Visitor Location Registers (VLR) 32 and Home Location Registers (HLR) 34. The HLR 34 stores access service profiles that contain information about access service parameters, which are cached in the VLR 32 while the mobile station 10 is registered in the service provider access network. An open interface, known as the R-P interface, is defined between the Radio Network 20 and the Packet Data Serving Node (PDSN) 30. The PDSN 30 interacts with the local or visited AAA (Authentication, Authorization, and Accounting) server 36 and with other servers using IP protocols within the IP Network 38.

An example Radio Network 20 is shown in FIG. 1B. It can include multiple base stations 21 that communicate with a switching center 22, or other central facility, and can for example be a CDMA2000 RAN. Each of the base stations 21 covers a geographic area as known in the art of cellular communications. A mobile station 10, which can be a cellular telephone device/personal communication device/mobile terminal, can receive communications from, and transmit communication to, a base station 21.

The coming availability of third generation mobile terminals with their multifunction capabilities and enhanced ease of roaming will increase the presence of such multifunction personal communications devices in everyday life. The attendant intrusions into shared spaces will also increase annoyances such as those caused by cell phones ringing, video teleconferences occurring, the web being surfed, games being played over the web, etc.

Accordingly, it would be desirable to provide a way to restrict use of third generation mobile terminals, including those with cell phone capability, in designated spaces.

SUMMARY OF THE INVENTION

In an IP-based cellular wireless communication system, embodiments of the invention provide systems and methods for spatially controlling cellular phone usage. Entry of a cellular phone device into an area of restricted phone access ("quiet zone") is detected and an IP message identifying the phone sent to a central facility. In one embodiment, an IP message is sent to the phone causing it to change behavior, for example turning off the volume on the ringer. Alternatively, the central facility can process an incoming call for a phone that is determined to be in a quiet zone to reduce intrusion in the quiet zone; for example, it can send the call to a phone mailbox or give the caller a busy signal.

In one embodiment, an IP message that includes information about whether a cellular phone device is in an area of restricted service access is received at a central facility. The message includes an identifier associated with the cellular phone device. Data associated with the cellular phone device is updated. The data can include a table of hushed phones maintained at the central facility, or can include a status associated with the cellular phone in a Home Location Register (HLR) or Visitor Location Register (VLR). In one embodiment, the central facility then sends an IP message that can include a hushing command, to the cellular phone device.

In one embodiment, when a call for a cellular phone device is received at the central facility, it is determined whether the cellular phone device is in an area of restricted service access (quiet zone). If not, the call is processed. If the cellular phone device is in an area of restricted service, the call is processed including special quiet zone processing. The special quiet zone processing can include sending the call to a phone mailbox or giving a busy signal to the caller.

In one embodiment, a method of operating a quiet zone controller in an IP based cellular system is provided. A cellular phone device is detected entering an area, the cellular phone device being serviced by a service provider control point, and sends an IP message to the service provider control point, the IP message including an identifier associated with the cellular phone device. In an embodiment, the cellular phone device is monitored. When it is determined that the cellular phone device has left the area, a second IP message is sent to a service provider control point. In an embodiment, a list of cellular phone devices in the area can be maintained locally if desired. In an embodiment, an IP message is sent to the cellular phone device that includes notification that the cellular phone devices has entered a quiet zone.

In an embodiment, a cellular phone device that is capable of varying its behavior in response to a hushing message is provided. The hushing message includes IP packets. In one embodiment, the phone goes into a quiet mode in response to the hushing message. In an embodiment, the hushing message can include an HTTP web page that includes selectable buttons. The cellular phone device changes its behavior according to a set of selectable buttons that is selected by an operator of the cellular phone device.

In one embodiment, an apparatus for spatially controlling cellular phone access in an IP based wireless communication system is provided. The apparatus includes a processing system and a memory storing code for operating said processing system. The code includes code that receives an IP message at a central facility, the message including information about whether a cellular phone device is in an area of restricted service access and an identifier associated with the cellular phone device; and code that updates data associated with the cellular phone device in response to receiving the IP message.

In one embodiment, a computer program product for spatially controlling cellular phone access in an IP-based cellular wireless communication system is provided. The computer program product comprises computer code that receives an IP message at a central facility, the message including information about whether a cellular phone device is in an area of restricted service access and an identifier associated with the cellular phone device; computer code that updates data associated with the cellular phone device in response to receiving the IP message; and a computer readable medium that stores the computer code.

In yet another embodiment a computer program product for operating a quiet zone controller in an IP-based cellular wireless communication system is provided. The computer program product comprises computer code that detects a cellular phone device entering an area, the cellular phone device being serviced by a service provider control point; computer code that sends an IP message to the service provider control point, the IP message including an identifier associated with the cellular phone device; and a computer readable medium that stores the computer code.

The cellular phone device can be a third generation mobile terminal or other IP capable communication device, including IP capable cellular phones.

A further understanding of the nature and advantages of the inventions herein may be realized by reference to the remaining portions of the specification and the attached drawings.

DESCRIPTION OF SPECIFIC EMBODIMENTS

Embodiments of the invention are described below with reference to specific processing systems and methods. However, embodiments of the invention can be implemented in various ways. For example, aspects of the invention can be implemented in software or hardware or using special purpose processors or by any other known mechanism. Therefore, the description of the embodiments that follows is for purposes of illustration and not limitation.

Figure 2:
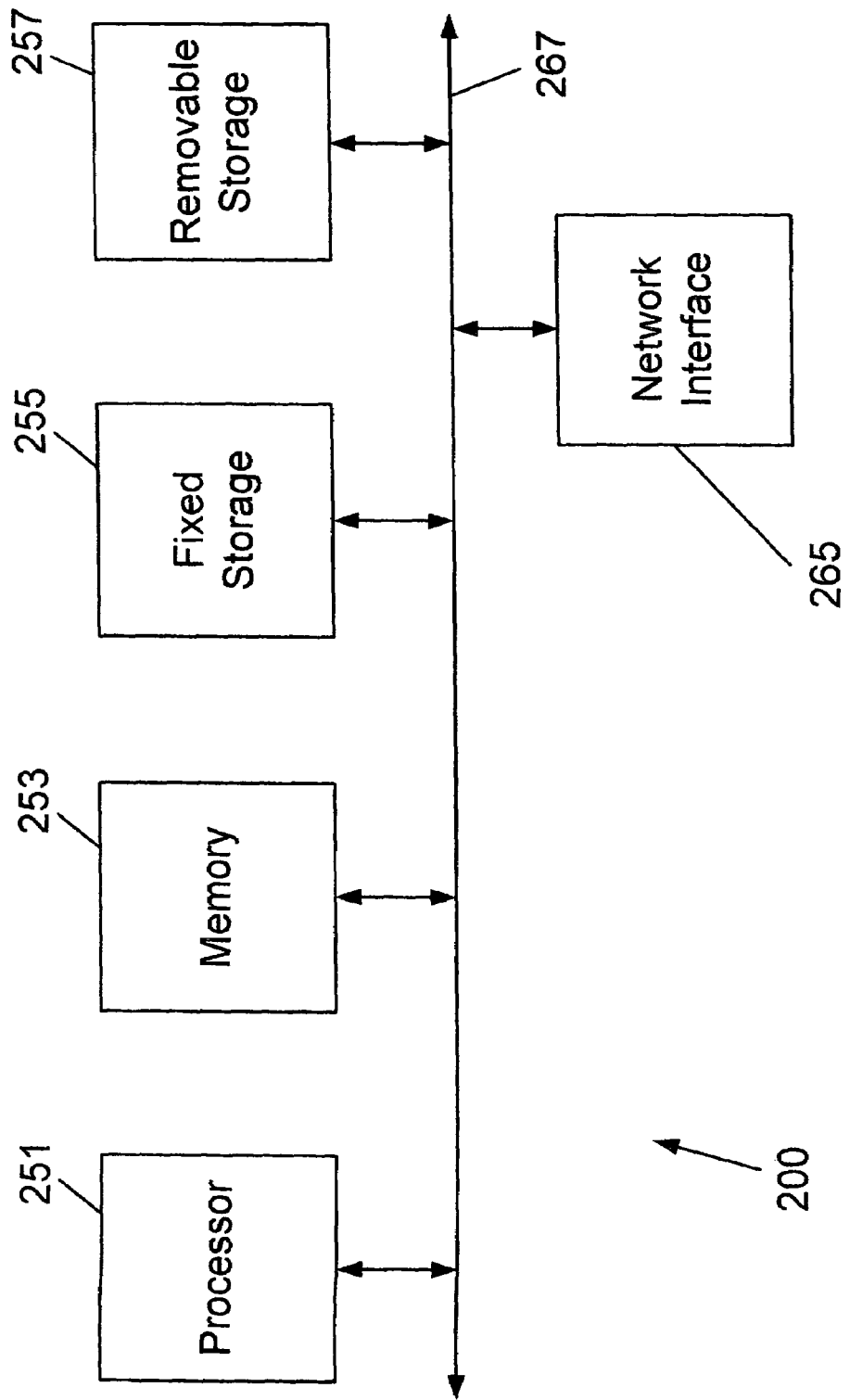
FIG. 2 illustrates a system block diagram of an example computer system that can be utilized to execute the software of an embodiment of the invention.

FIG. 2 shows a system block diagram of a computer system 200 that can be used to execute software implementing a portion of a method of an embodiment of the invention. For example the computer system 200 can run software used in a quiet zone controller 340 (described below) or can run software at switching center 22. Computer system 200 can include subsystems such as a central processor 251, system memory 253, fixed storage 255 (e.g., hard drive), removable storage 257 (e.g., CD-ROM drive), and network interface 265.

System memory 253, fixed storage 255, and removable storage 257 can be utilized to store and retrieve software programs incorporating computer code that implements the invention, data for use with the invention, and the like. Although CD-ROM 15 is shown as an exemplary computer readable storage medium, other computer readable storage media including floppy disk, tape, flash memory, system memory, and hard drive can be utilized. Additionally, a data signal embodied in a carrier wave (e.g., in a network including the Internet) can be the computer readable storage medium.

The system bus architecture of computer system 200 is represented by arrows 267. However, these arrows are illustrative of any interconnection scheme serving to link the subsystems. For example, a local bus could be utilized to connect the central processor to the system memory and display adapter. Computer system 200 shown in FIG. 2 is but an example of a computer system suitable for use with the invention. Other computer architectures having different configurations of subsystems including additional or fewer subsystems can also be utilized.

Figure 1A:
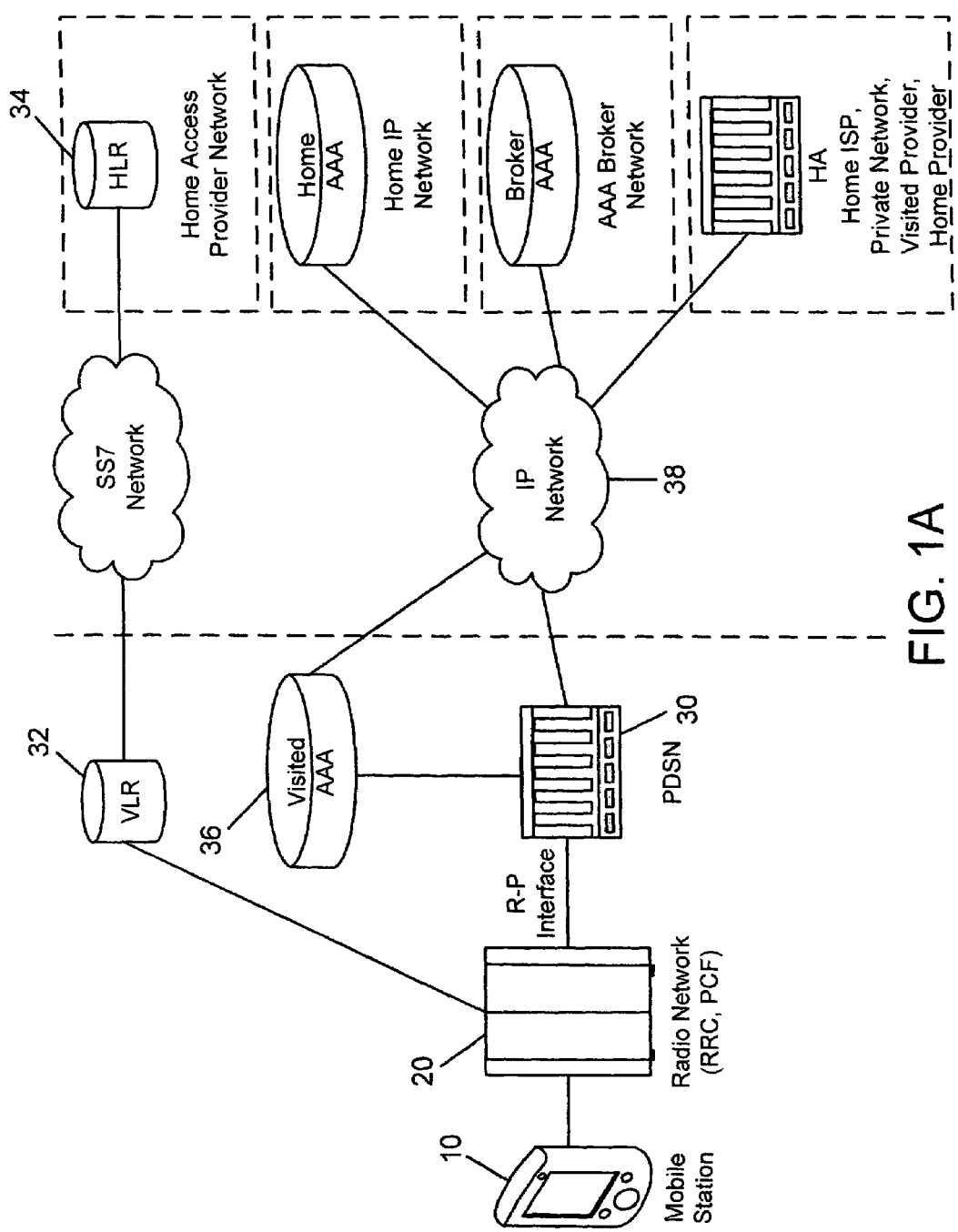
FIG. 1A is a simplified model of the packet data system architecture for a third generation wireless system based on IMT-2000.
Figure 1B:
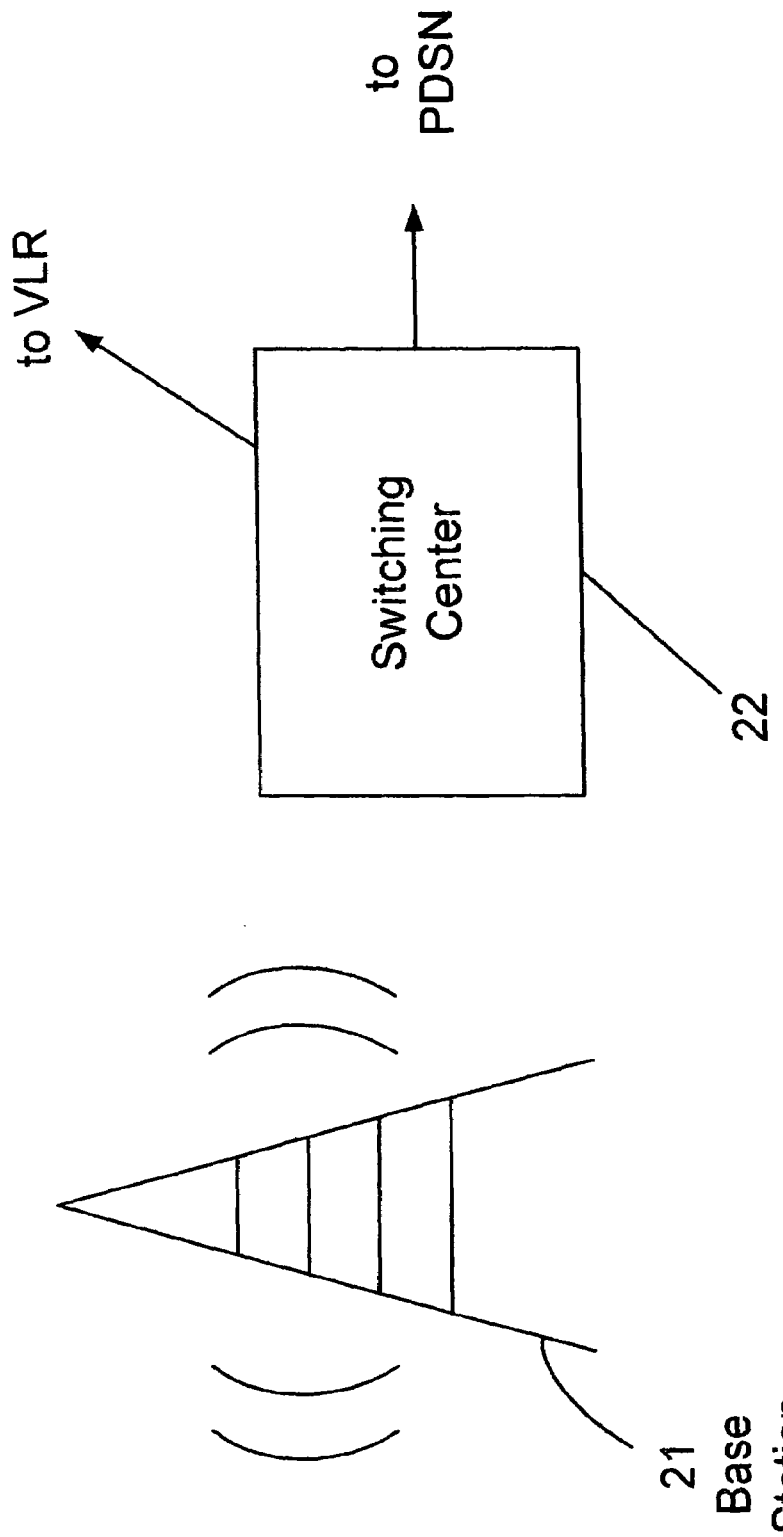
FIG. 1B is a diagram of an example radio access network.
Figure 3A:
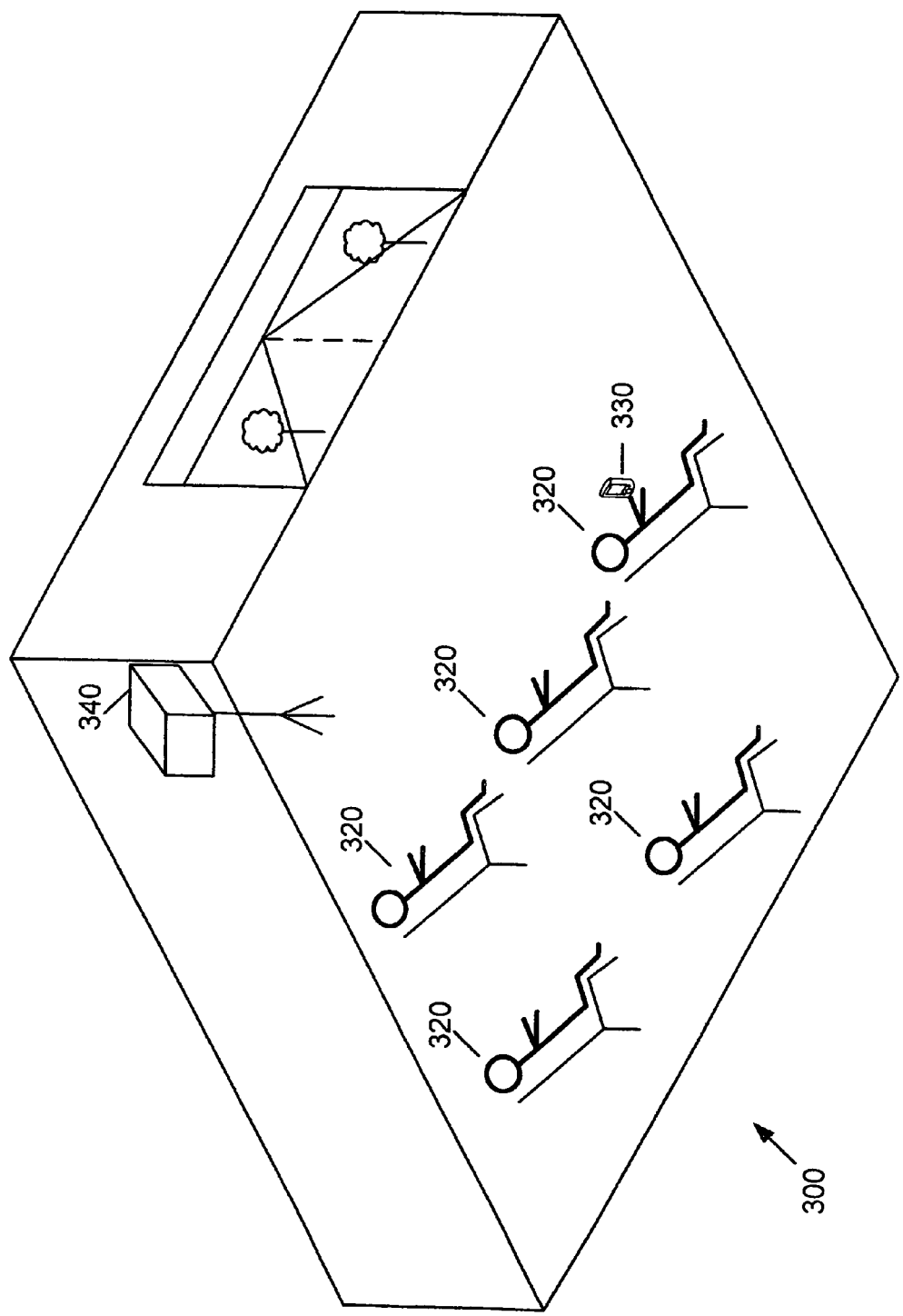
FIG. 3A illustrates an embodiment of the invention.

FIG. 3A shows an embodiment of the invention. A venue 300, for example a movie theater or restaurant, can accommodate human patrons 320. One or more patrons 320 can have a mobile communication device 330, with IP capability, such as a cellular phone device with IP capability or a third generation cellular device with web access, phone, and video teleconferencing capability. The device 330 can communicate with the telephone system or Internet or other service provider through a radio access network, such as the setup shown in FIG. 1.

In a preferred embodiment a quiet zone controller 340 communicates through the radio access network with one or more services. The quiet zone controller monitors an area of interest in the venue for the presence of mobile communication devices. This can be done by monitoring transmission in the area, for example, monitoring autonomous registration information. (As known in the art, a phone on being turned on tunes into the overhead signal sent by the system and registers with the mobile telephone switching office (MTSO), which records location information in the HLR database (or VLR database if the phone is roaming). The system periodically, e.g. every 5-15 minutes, requests the phone to re-identify itself, and if the phone is turned on it responds by transmitting identification information, which can include its electronic serial number (ESN) and mobile identification number (MIN); this process is called "autonomous registration". Using autonomous registration, the system can monitor approximately where the phone is in the network, which allows it to limit the number of cells/base stations to be contacted to reach the phone.)

The quiet zone controller preferably communicates with a central facility, such as switching facility 22 by transmitting messages to a base station 21 that relays the message to the switching facility 22, but any known method of communication can be used. The central facility can be any entity that controls access to the base stations or routes calls, and can be a facility that is analogous to the Mobile Telephone Switching Office (MTSO) or Mobile Switching Center (MSC) in second generation systems.

In an alternative structure according to the present invention, quiet zone controller 340 is associated with a particular cell that has been set up inside a building to assure cellphone coverage within the building or at a high subscriber density location. This makes it easier to intercept registration information.

Figure 3B:
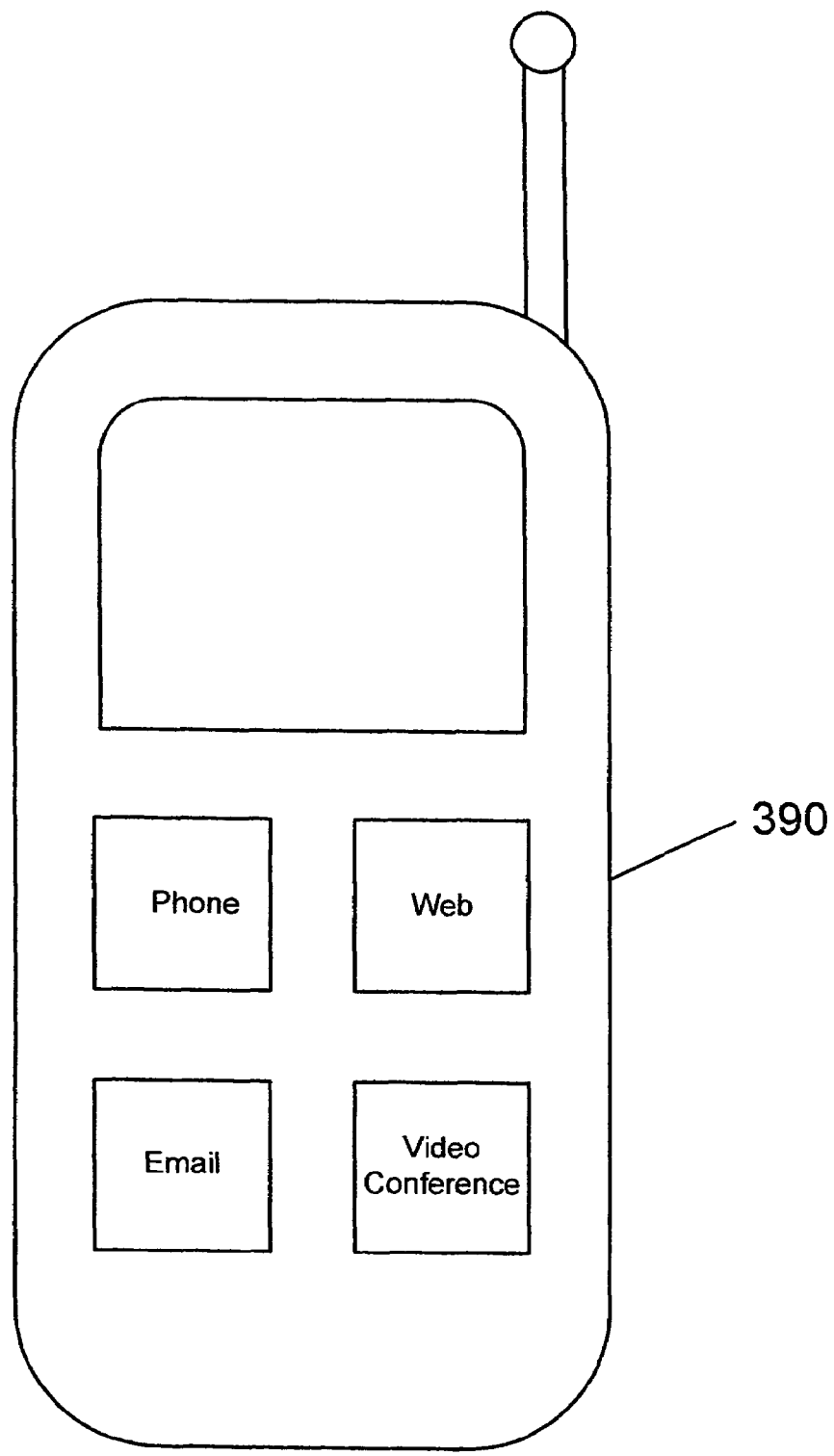
FIG. 3B illustrates a sample wireless multi-function communication device with phone capability.

FIG. 3B is an illustration of an example mobile communication device 390 that has phone, web access, email, and videoconference capability. The mobile communication device 390 preferably has the ability to be electronically switched to different modes of operation, for example to a mode where the phone vibrates instead of rings.

Figure 4:
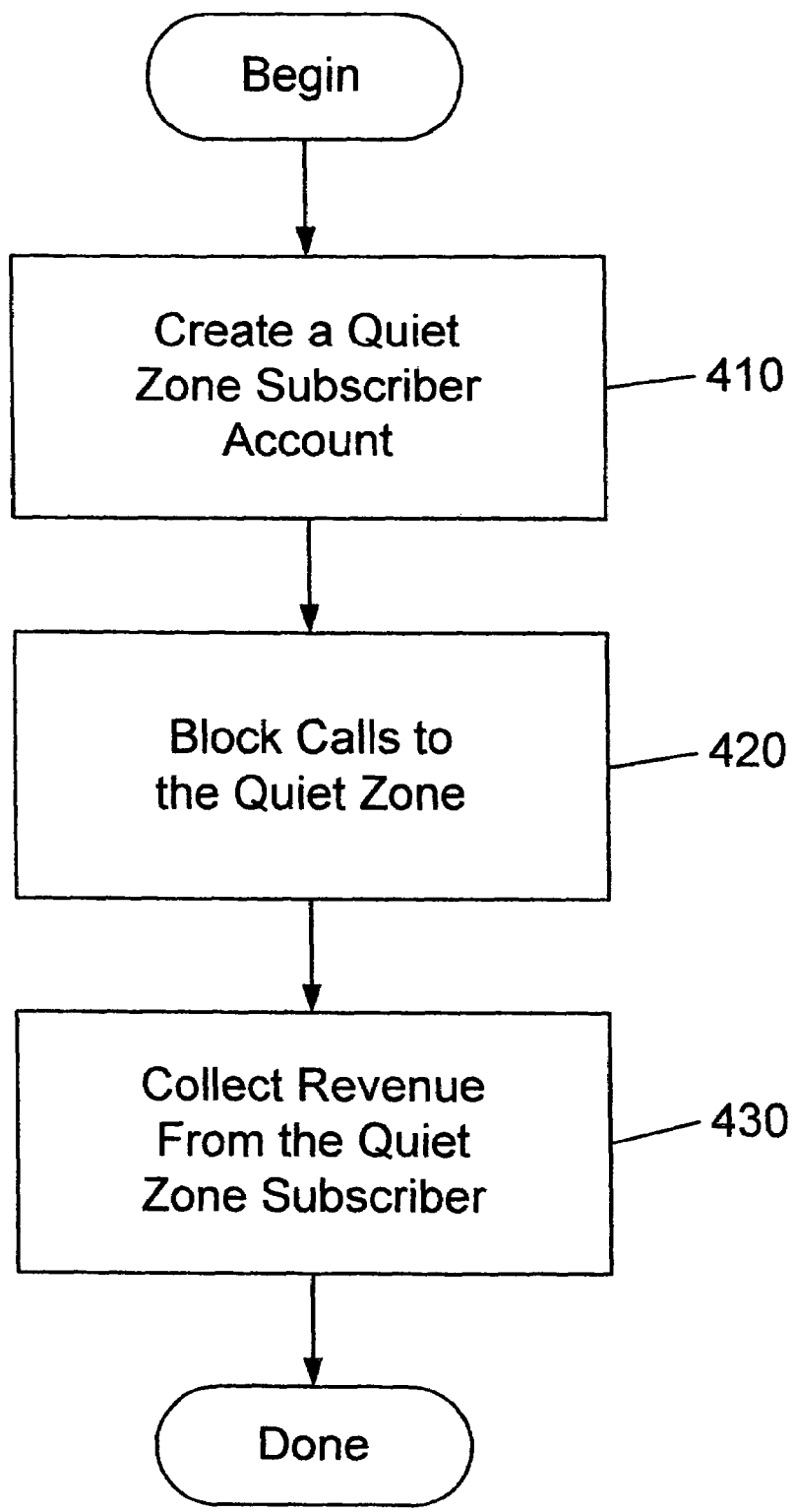
FIG. 4 is a top level flow chart describing the process of providing a quiet zone service.

FIG. 4 is a top level process flow diagram of providing a quiet zone service. At a step 410 a quiet zone subscriber account is created. The subscriber account can include information such as billing address and payment plan as well as details of the quiet zone such as hours of operation, e.g. for a theater it might be desired for the quiet zone to be active only during a performance. It can also include the physical parameters of the quiet zone, e.g. the latitude and longitude of endpoints of line segments making up a quiet zone. The physical parameters of the quiet zone can be used if it is desired that whether a phone is in a quiet zone be determined by using GPS to locate a phone having a GPS transmitter, in which case whether the phone is in a quiet zone can be determined by comparing the phone's location with one or more parameters of the quiet zone, and a quiet zone controller 340 need not be deployed in the quiet zone. Preferably a portion of the quiet zone subscriber account information is available at the central facility/switching center 22 that communicates with the base station 21 whose geographic coverage includes the quiet zone.

At a step 420 phone calls to phones in a quiet zone are blocked or otherwise processed to reduce disruption to a quiet zone, as described below. At a step 430 revenue is collected from the quiet zone subscriber.

Figure 5:
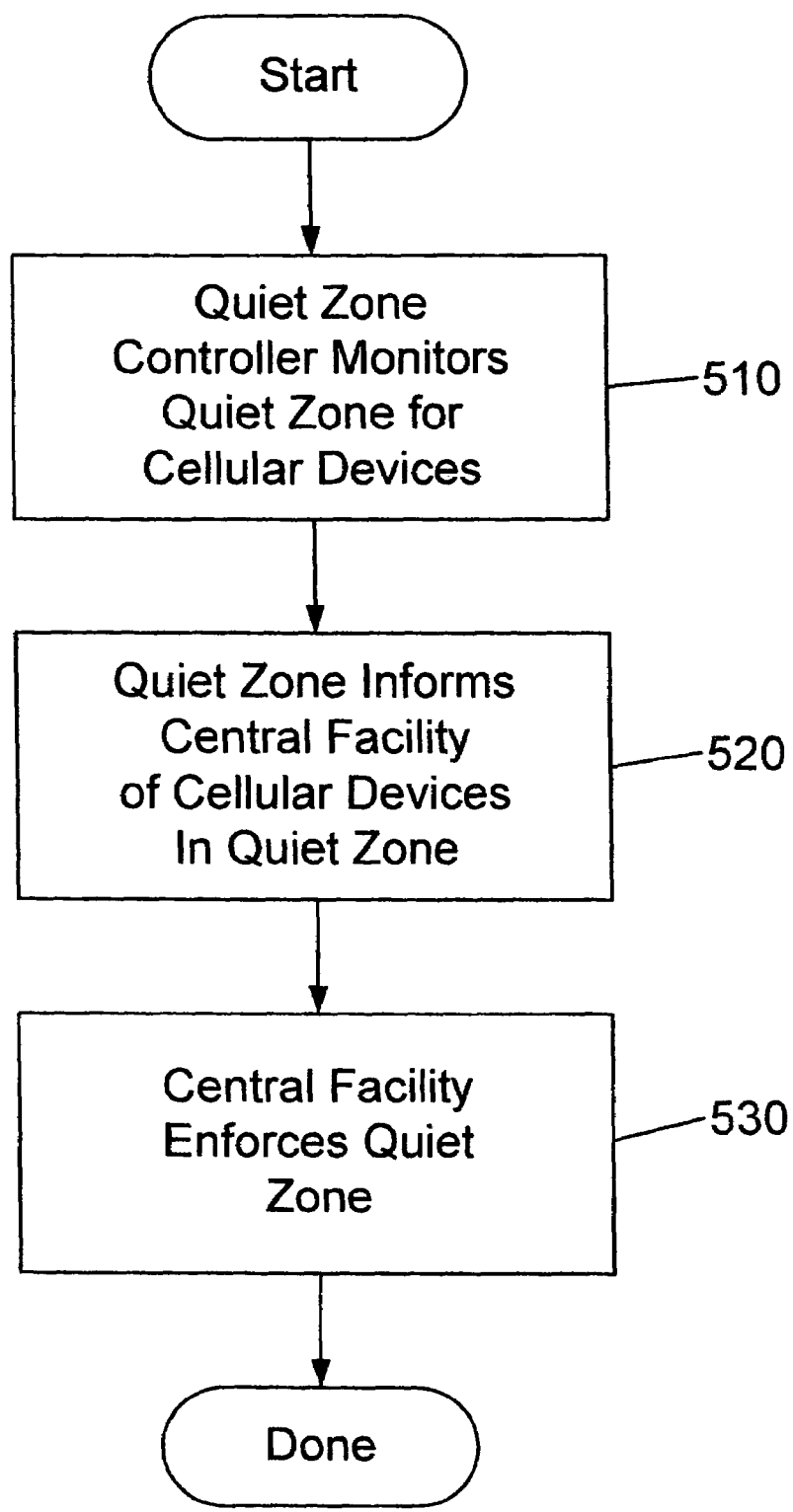
FIG. 5 is a process flow diagram of an overview of maintaining a quiet zone in a preferred embodiment.

FIG. 5 is a process flow diagram of an overview of maintaining a quiet zone in a preferred embodiment. A quiet zone controller monitors the quiet zone for cellular devices at a step 510. At a step 520 the quiet zone controller keeps the switching center 22 informed of what cellular devices are in the quiet zone. This can be done by informing the switching center 22 whenever a new cellular device is detected in the quiet zone and whenever a cellular device is determined to have left the quiet zone. Any known methods can be used to determine whether a device has left the quiet zone; for example, the device can be deemed to have left the quiet zone after a preset period of time has passed without detecting a signal, such as autonomous registration, from the phone. Note that if a phone has been turned off, it is acceptable to deem it as having left the quiet zone, as it will not function when off. The central facility enforces the quiet zone at a step 530, as described below.

Figure 6A:
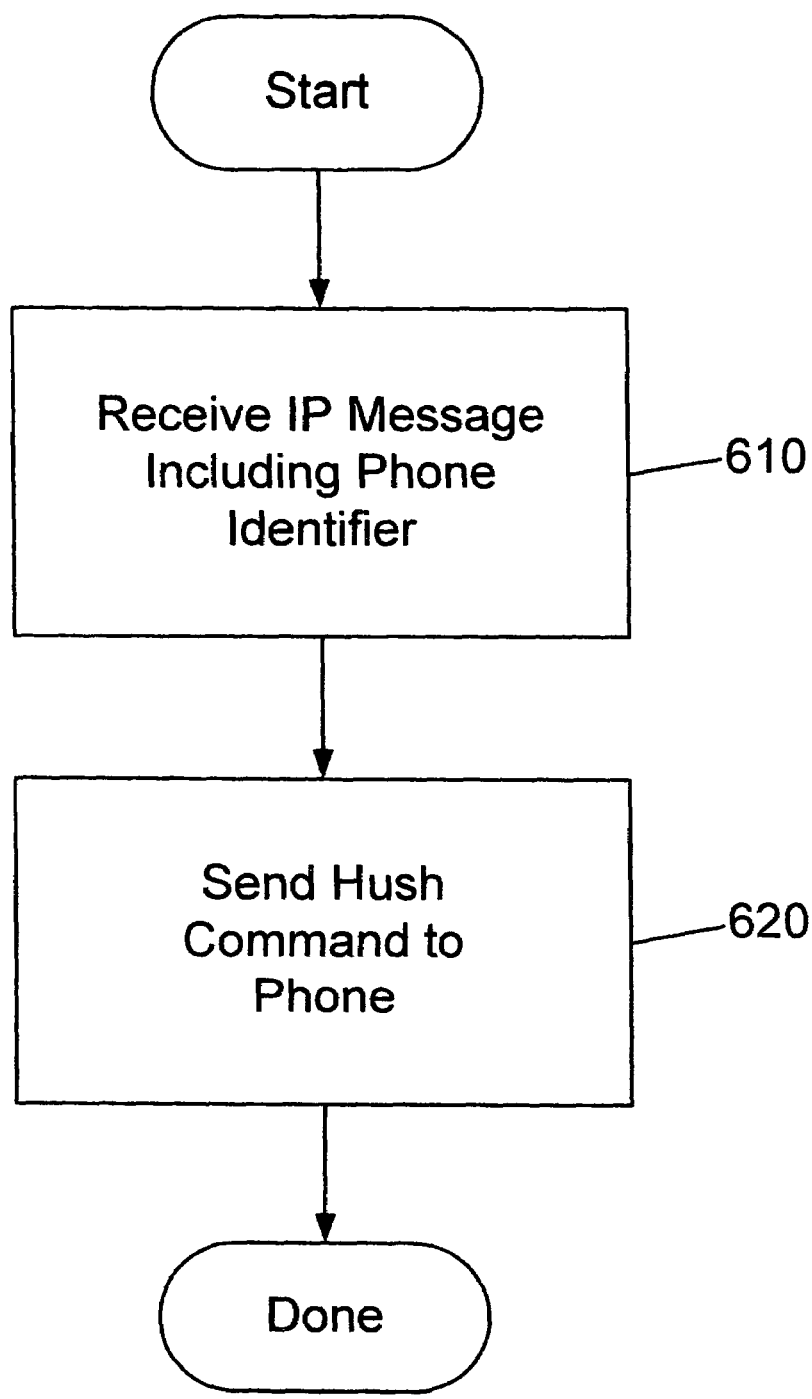
FIG. 6A is a process flow diagram of hushing a phone.

One method of enforcing the quiet zone is to put the phones in the quiet zone into a quiet mode. The quiet mode of a cellular device can include for example turning the power off, setting a ringer volume to zero, or switching from a ring mode to a vibrate mode. FIG. 6A shows a process flow diagram of enforcing a quiet zone by changing the mode of operation of the cellular device. At a step 610, a central facility receives an IP message that includes information that a phone has entered a quiet zone. An identifier that identifies the phone is included in the message. The identifier for example can be the phone's mobile identification number (MIN), or the ESN or both. Preferably the message also identifies the quiet zone. The central facility preferably is a switching center. Preferably the IP message is one that has been sent by a quiet zone controller and has been relayed through the radio access network to the central facility. At a step 620, the central facility sends a hushing command to the phone, preferably by sending an IP message the base station, which relays it to the phone. The hushing command causes the phone to go into a quiet mode and can be configurable, for example it can be a command for the phone to turn itself off.

Figure 6B:
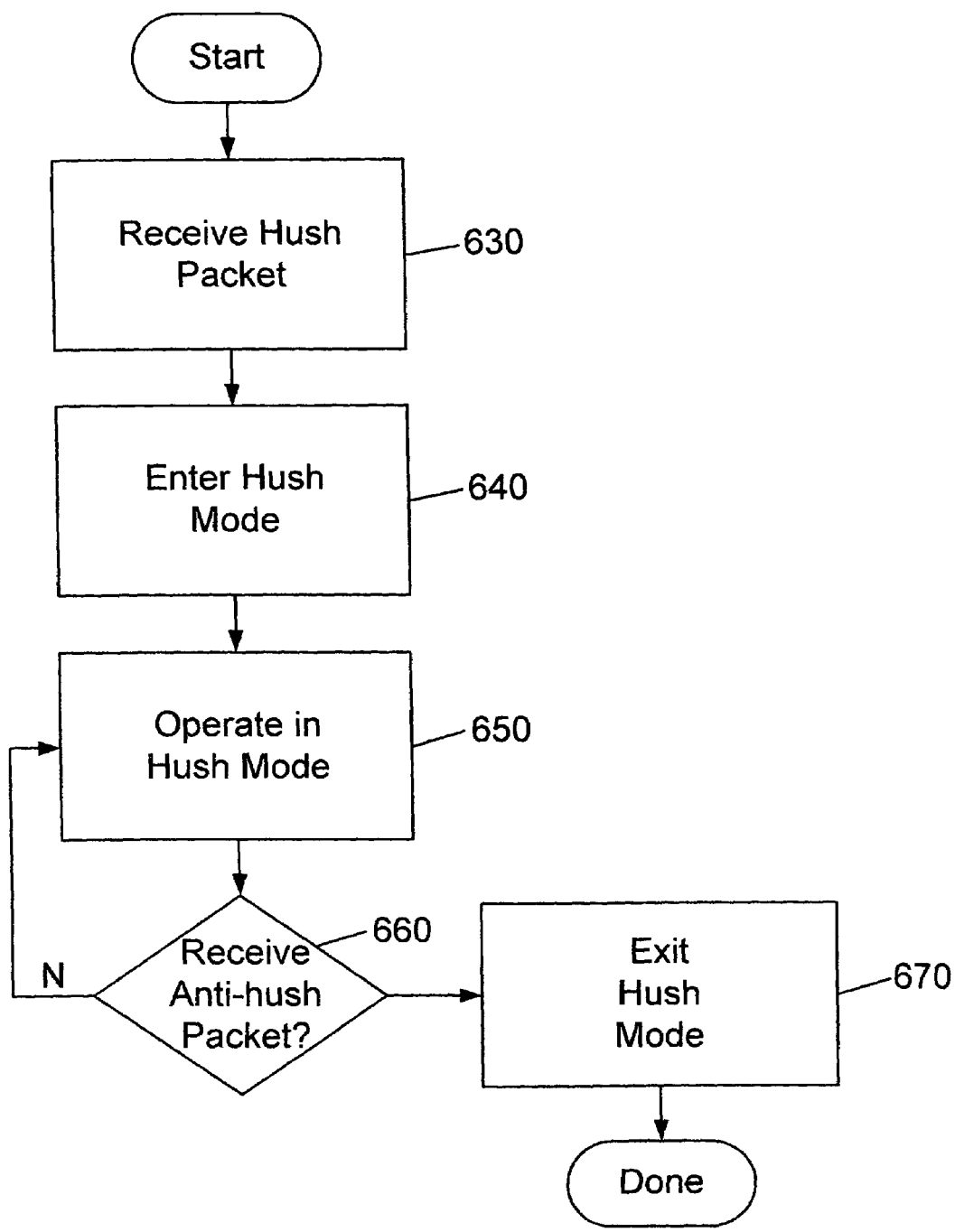
FIG. 6B is a top level diagram of entering/exiting hush mode.

FIG. 6B is a top level diagram of entering/exiting hush mode. At a step 630 a hush packet is received. At a step 640 a hush mode is entered. In a preferred embodiment, the user is able to configure his phone's hush mode. For example, the user can use a web application that offers a selection of selectable options to configure hush mode to have the phone vibrate and not ring; alternatively or additionally there can be a physical switch on the phone that can be manually moved to select how the phone will respond when in hush mode, e.g. with three settings on the switch: send message to mailbox, give a busy signal, or vibrate.

At a step 650 the phone operates in hush mode. At a decision step 660, it is decided whether an anti-hush packet has been received. If an anti-hush packet has not been received, the phone continues to operate in hush mode. If an anti-hush packet has been received, the phone exits hush mode at a step 670. In a preferred embodiment, exiting hush mode includes returning to the mode of operation the phone was in prior to receiving a hush packet. In an alternate embodiment, exiting hush mode can include resetting the phone to a default setting. Also, hush mode may be exited automatically upon movement to a different cell.

It should be noted that according to the present invention, a quiet mode or hush mode may be required in a given zone for reasons other than preventing audible disturbance to those in the vicinity. For example, the quiet zone may be defined so that phones in the zone will have their transmitters turned off for the purpose of preventing RF interference to sensitive devices. This embodiment will provide protection in hospitals, airplanes, and other areas where cellphone transmitters should be kept off for safety reasons.

Figure 7A:
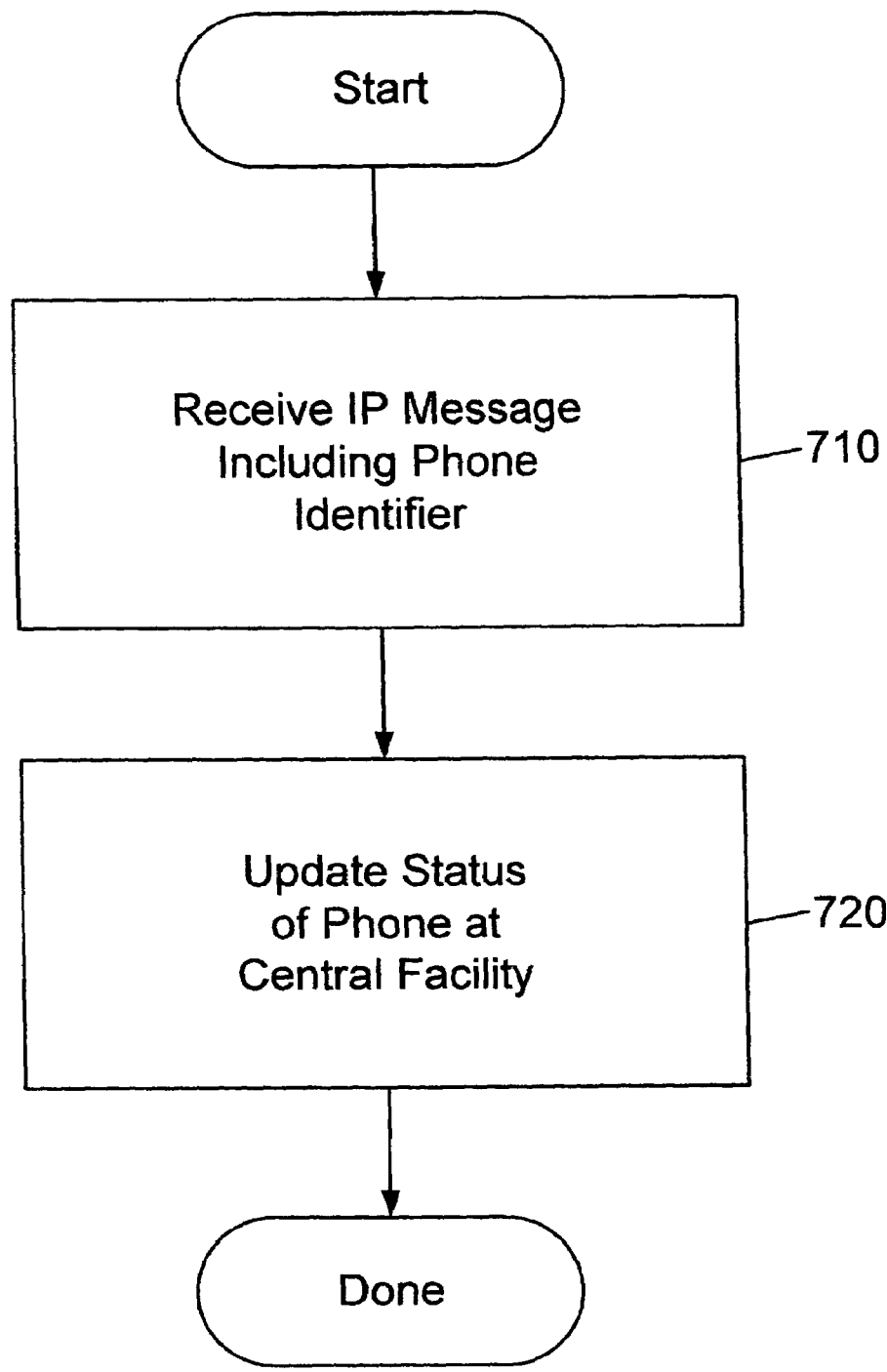
FIGS. 7A-C are process flow diagrams of maintaining information about phones in a quiet zone and updating the status of a phone.
Figure 7B:
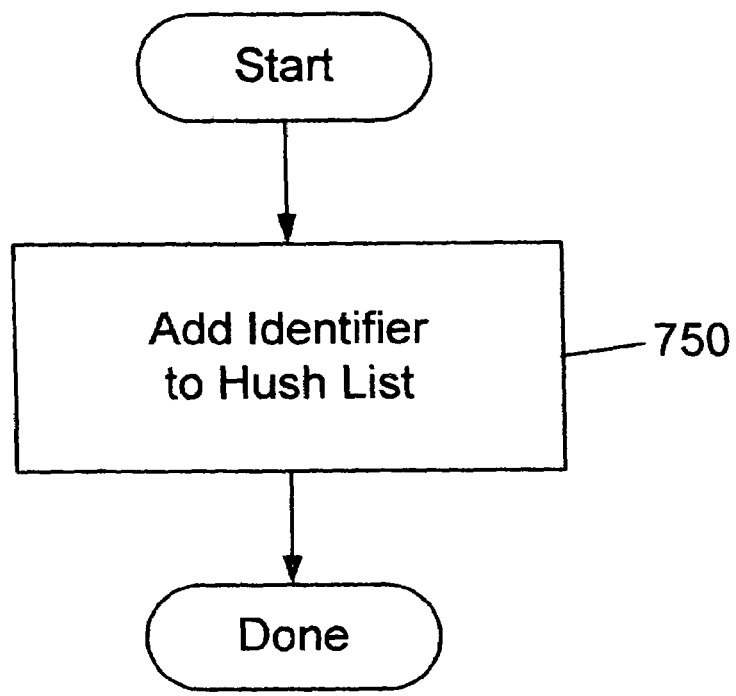
Figure 7C:
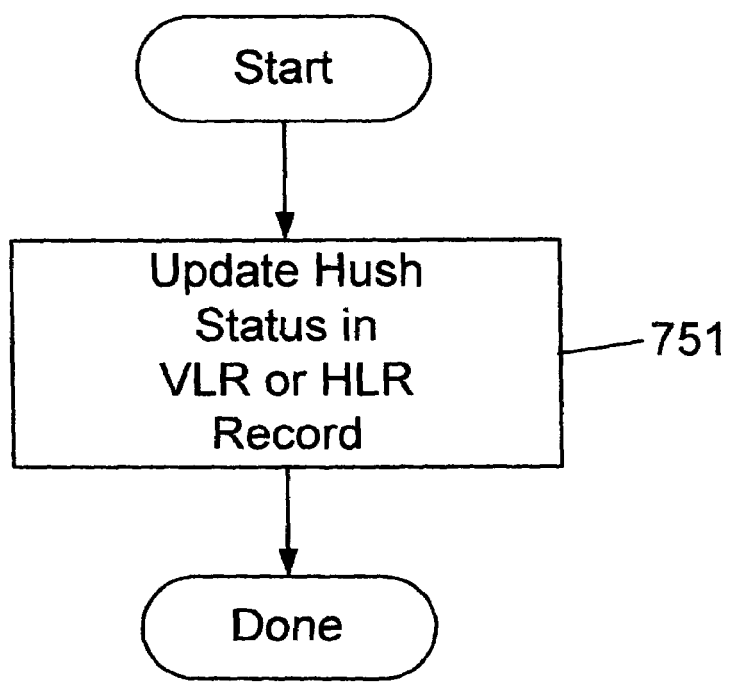

An alternative way of enforcing a quiet zone is to keep track of which phones are in quiet zones, and process calls for these phones in a way that minimizes disturbances in the quiet zone. A process flow diagram for maintaining information about phones in quiet zones is shown in FIG. 7A. An IP message including an identifier associated with a phone is received at a central facility, which preferably is a switching center 22, at a step 710. Preferably the IP message is sent by a quiet zone controller 340 in a quiet zone, and the phone has been detected in the quiet zone. At a step 720 the status of the phone is updated at the central facility. The status of the phone can be updated by adding the identifier of the phone to a list of hushed phones (phones in quiet zones), as shown in step 750 in FIG. 7B. Alternatively, a hush status field can be maintained in the visitor location register (VLR) or home location register (HLR) of the phone as shown in step 751 of FIG. 7C. The value of the field can be varied depending on parameters associated with the quiet zone the phone is in. For example, in some quiet zones the phone may be completely disabled (no incoming or outgoing calls), whereas in other quiet zones partial services can be maintained (for example, outgoing calls only are allowed, or only emergency calls are allowed such as 911 calls or operator breakthroughs).

Figure 8A:
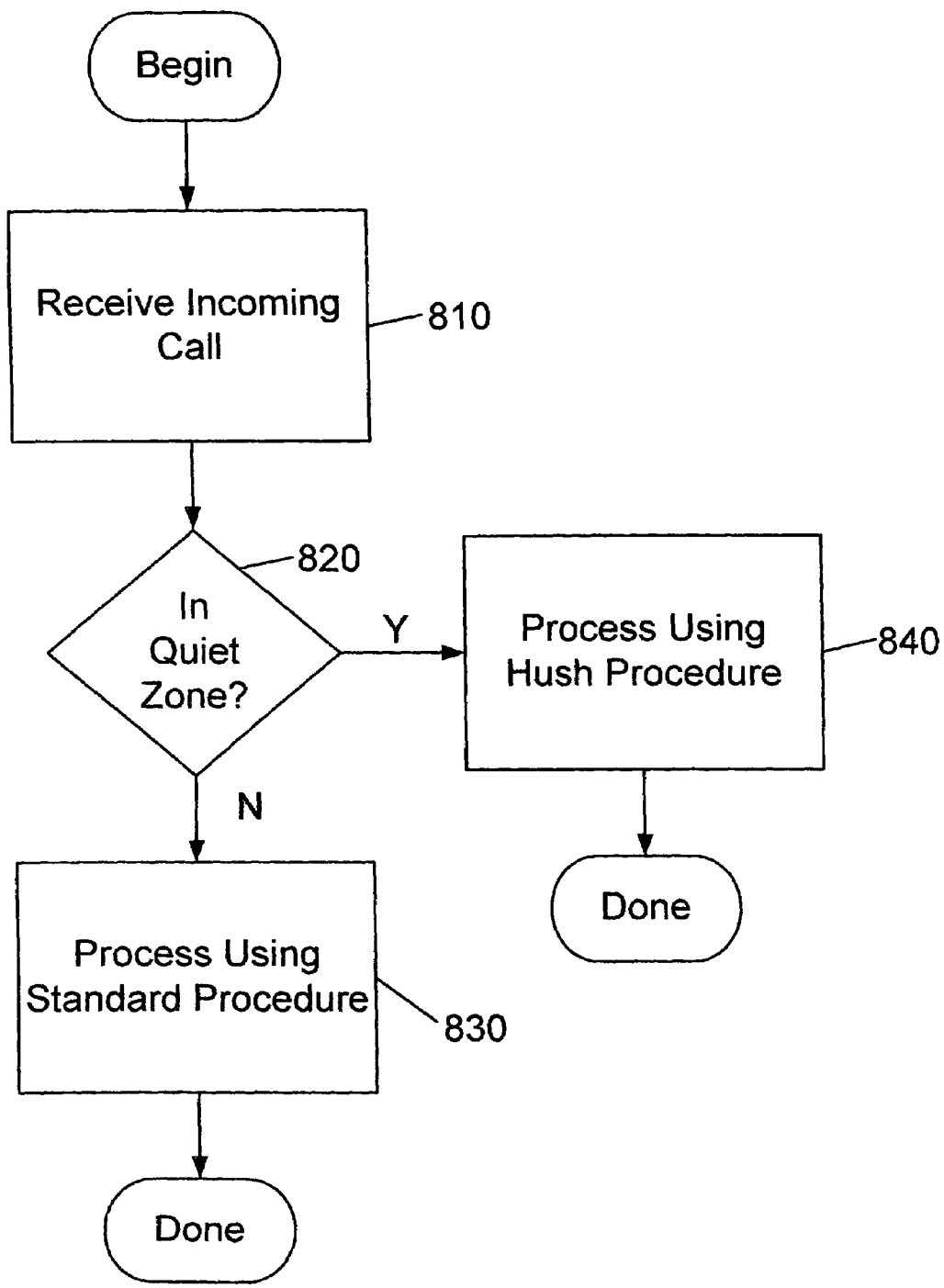
FIGS. 8A-C are process flow diagrams of processing a call at a central facility and determining whether a phone is in a quiet zone.

A process flow diagram for processing calls is shown in FIG. 8A. At a step 810 an incoming call for a phone is received at a central facility. At a decision step 820 it is determined whether the phone is in a quiet zone. If the phone is not in a quiet zone, the process proceeds along a NO path to a step 830 where the call is processed using standard procedures. If result of decision step 820 is that the phone is in a quiet zone, the process proceeds to a step 840 where the call is processed using a hush, or quiet zone, procedure. The quiet zone procedure can include for example giving the caller a busy signal or sending the caller to a voice mailbox.

Figure 8B:
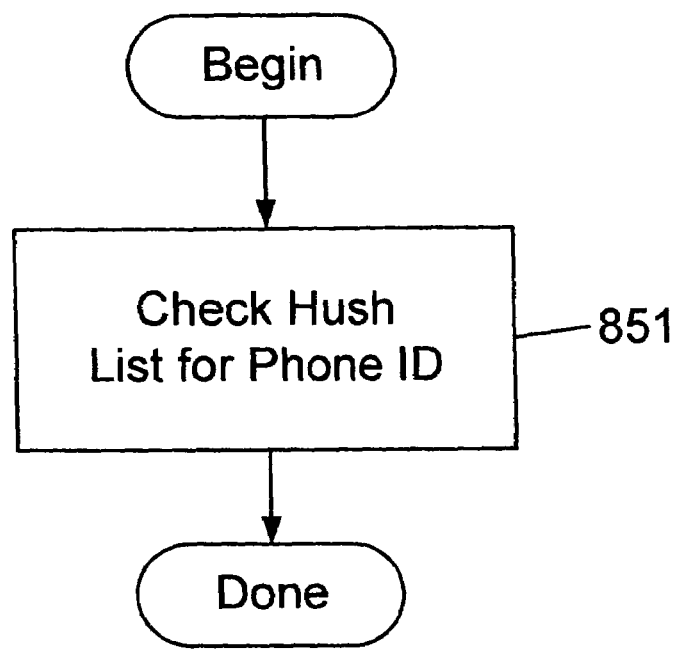
Figure 8C:
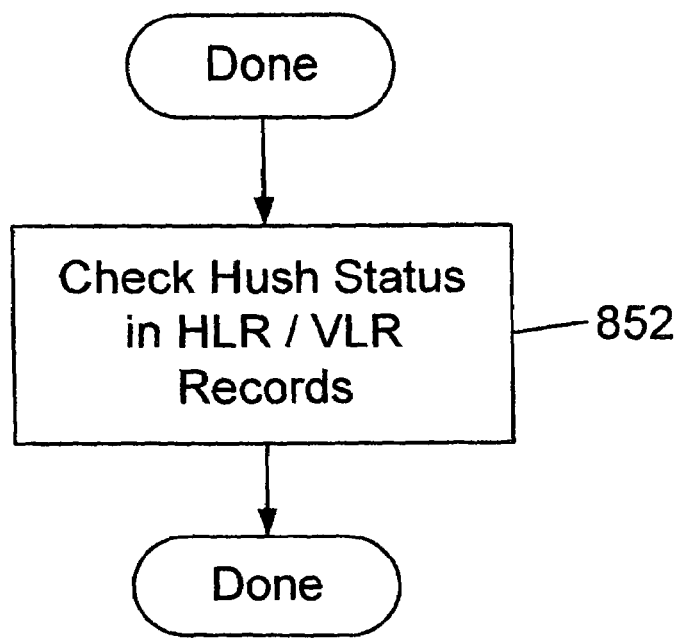

FIGS. 8B and 8C show two ways for it to be determined whether the phone is in a quiet zone. A list of phones that are in quiet zones can be checked for the phone as shown in step 851 of FIG. 8B. Alternatively, a hush status can be checked in the visitor location register (if the phone is visiting/roaming) or the home location register of the phone, as shown in step 852 of FIG. 8C.

Figure 9:
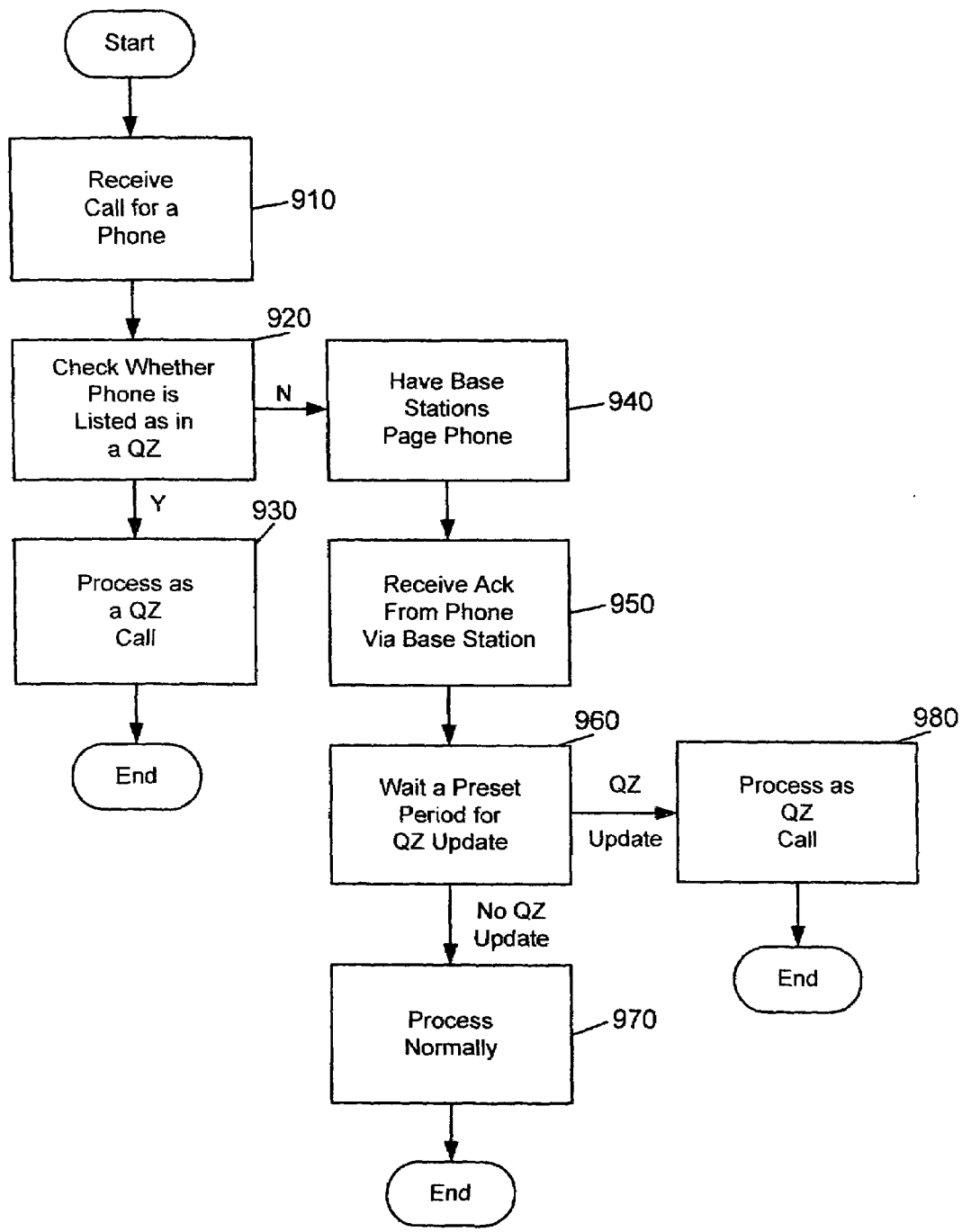
FIG. 9 is a process flow diagram of processing a call with simultaneous updating of a phone status.

FIG. 9 shows an alternative method of processing a call that includes simultaneous updating of the quiet zone information. At a step 910 a call for a phone is received at a central facility. At a step 920 it is checked whether the phone is in a quiet zone, either by checking a list or by checking a status field in a VLR or HLR. If the phone's status is hushed, the call is processed as a quiet zone call. If the phone is not hushed, then base stations are commanded to page the phone at a step 940. An ACK will be received from the phone via a base station as known in the art at a step 950. The process waits for a preset period of time to pass at a step 960. If a quiet zone update for the phone has not been received by the central facility after the preset period of time has passed, the call is processed with standard processing. If, before the expiration of the preset period, a quiet zone update for the phone is received by the central facility indicating the phone is in a quiet zone, the call is processed as a quiet zone call as described with regard to FIG. 8.

In an alternate embodiment, the quiet zone controller need not communicate with a central facility, but can merely send an IP message to phones detected in the quiet zone. The IP message can, for example be a request to the phone user to turn the phone off, or it can be a message with a selectable buttons that can be selected by the user to change the mode of the phone, for example to turn the ringer off.

While the above is a complete description of preferred embodiments of the invention, various alternatives, modifications, and equivalents can be used. It should be evident that the invention is equally applicable by making appropriate modifications to the embodiments described above. For example, the flowcharts are exemplary embodiments but steps may be added, deleted, combined, and reordered without departing from the spirit and scope of the invention. Therefore, the above description should not be taken as limiting the scope of the invention that is defined by the metes and bounds of the appended claims along with their full scope of equivalents.

For example, referring to FIG. 9, steps 920-930 can be eliminated, and the quiet zone controller can be programmed to always send an update when it detects an ACK being sent by a phone in the quiet zone. Or, an IP message can be sent to a phone in a quiet zone with selectable buttons allowing the user to change mode of the phone or additionally or alternatively to select the processing of calls, for example the user can choose to send all calls to a mailbox, give a busy signal, turn the phone off etc.

The foregoing describes embodiments of an invention that can provide control over IP cellular telephones in certain zones. The features over which control is exerted are configurable.

I claim:

1. In an IP-based cellular wireless communication system, a central facility comprising:
    a receiver arrangement for receiving a call for a cellular phone device, the receiver arrangement further being arranged to receive an IP message through a radio access network, wherein the IP message identifies the cellular phone device and provides information that the cellular phone device has entered an area of restricted service access;
    a processor arrangement for determining whether the cellular phone device is in said area of restricted service access, wherein determining whether the cellular phone device is in the area of restricted service access includes determining whether said information that the cellular phone device has entered the area of restricted service access has been relayed in the IP message through a radio access network, the processor arrangement being arranged to forward the call to the cellular phone device when it is determined that the cellular phone device is not in the area of restricted service access, the processor arrangement further being arranged to perform special quiet zone processing when it is determined the cellular phone device is in the area of restricted service access; and
    a sending arrangement for sending a hush command to the cellular phone device upon receiving said IP message.

2. The central facility of claim 1 wherein the processor arrangement is arranged to send the call to a phone mail box when performing the special quiet zone processing.

3. The central facility of claim 1 wherein the central facility is a switching center that controls access to a plurality of cellular base stations.

4. The central facility of claim 1 wherein the processor arrangement is further arranged to update data associated with the cellular phone device in response to receiving the IP message.

5. The central facility of claim 4 further including a storage arrangement, wherein the processor arrangement is arranged to update data by adding an identifier associated with the cellular phone device to a table of hushed phones stored in the storage arrangement.

6. The central facility of claim 5 wherein the processor arrangement is arranged to update data by setting a status associated with the cellular phone device in one or more location records stored in the storage arrangement to be a hush status, the one or more location records including at least one of a Home Location Register (HLR) and a Visitor Location Register (VLR).

7. The central facility of claim 1 wherein the IP message sent to the cellular phone device includes an HTTP web page with selectable buttons associated with hush options.

8. The central facility of claim 1 wherein information that the cellular phone device has entered the area of restricted service access comprises an identifier of the cellular phone device and identification of the area of restricted service access.

9. The central facility of claim 1 wherein the IP message is received from a quiet zone controller.

* * * * *